(12) United States Patent
Veenstra

(10) Patent No.: US 7,576,660 B2
(45) Date of Patent: Aug. 18, 2009

(54) FUEL RETENTION MONITORING SYSTEM FOR A PRESSURIZED HYDROGEN STORAGE TANK ON A VEHICLE AND METHOD OF USE

(75) Inventor: Michael Jon Veenstra, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 306 days.

(21) Appl. No.: 11/755,152

(22) Filed: May 30, 2007

(65) Prior Publication Data

US 2008/0297362 A1    Dec. 4, 2008

(51) Int. Cl.
G08B 17/10 (2006.01)
(52) U.S. Cl. .................... 340/632; 429/12; 429/23; 454/75
(58) Field of Classification Search ................ 340/632; 95/96, 141; 429/12, 13, 19, 23; 454/75, 454/162
See application file for complete search history.

(56) References Cited

U.S. PATENT DOCUMENTS

| | | | |
|---|---|---|---|
| 6,159,626 A * | 12/2000 | Keskula et al. ................ 429/12 |
| 6,290,594 B1 * | 9/2001 | Osborne ...................... 454/75 |
| 6,444,345 B2 | 9/2002 | Sang | |
| 6,526,950 B2 * | 3/2003 | Ito et al. ...................... 123/518 |
| 6,815,101 B2 | 11/2004 | de Vaal et al. | |
| 6,953,630 B2 * | 10/2005 | Wells ........................... 429/13 |
| 7,326,276 B2 * | 2/2008 | Sumi et al. ...................... 95/96 |
| 2003/0008185 A1 | 1/2003 | Sugino et al. | |
| 2004/0091754 A1 | 5/2004 | Bette et al. | |
| 2005/0026010 A1 * | 2/2005 | Nonobe et al. ................ 429/13 |
| 2005/0058861 A1 | 3/2005 | Pettit et al. | |
| 2005/0147863 A1 * | 7/2005 | Hiramatsu et al. ............ 429/34 |
| 2005/0175873 A1 | 8/2005 | Edwards et al. | |
| 2005/0228596 A1 | 10/2005 | Shoji | |

* cited by examiner

Primary Examiner—John A Tweel, Jr.
(74) Attorney, Agent, or Firm—Damian Porcari; Brooks Kushman P.C.

(57) ABSTRACT

The invention relates to a fuel retention monitoring system for a pressurized hydrogen storage tank on a vehicle. The vehicle includes a hydrogen dispensing system having a plurality of conduits for carrying a hydrogen gas. The conduits have at least one connection linking them together. The monitoring system includes a vapor concentrator for the hydrogen gas, shrouding a first one of the connections. The first connection has a parting line where the conduits forming the connection meet. The vapor concentrator may be positioned above the parting line of the first connection and may include a periphery and a top defining a headspace cavity. The monitoring system further includes a hydrogen gas sensor locatable adjacent to the headspace cavity and capable of providing a signal correlated to a hydrogen gas concentration in the headspace cavity.

20 Claims, 3 Drawing Sheets

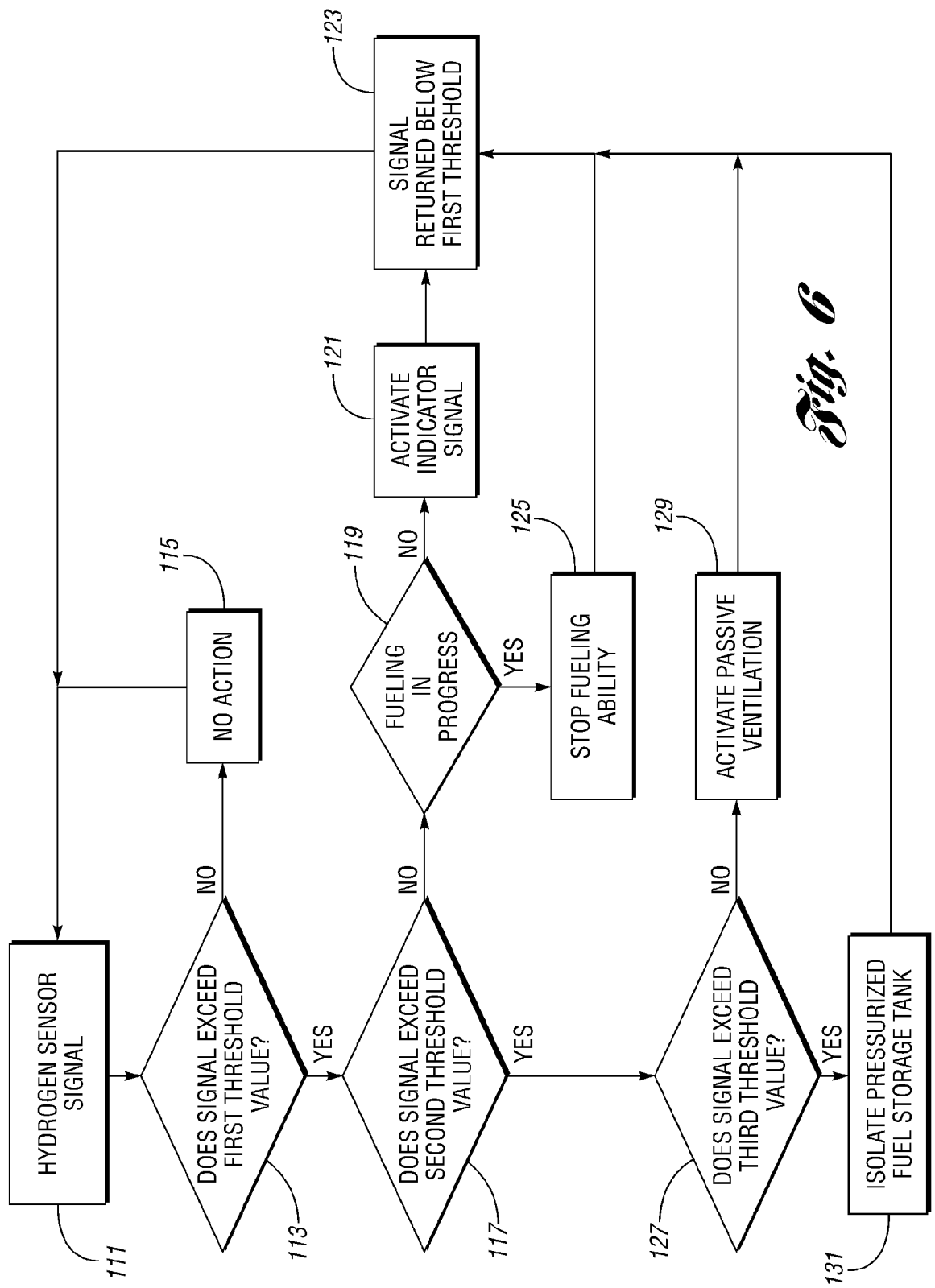

FUEL RETENTION MONITORING SYSTEM FOR A PRESSURIZED HYDROGEN STORAGE TANK ON A VEHICLE AND METHOD OF USE

BACKGROUND OF THE INVENTION

1. Field of the Invention

The invention relates to a fuel retention monitoring system for a pressurized hydrogen storage tank on a vehicle and method of using such a system.

2. Background Art

Energy management is a concern for vehicle manufacturers who are trying to achieve improved energy efficiency for their vehicles. Concurrently, vehicle manufacturers are exploring options of alternate fuel systems to petroleum-based liquids. When such alternate fuel systems require hydrogen as a fuel, storage of hydrogen is done conventionally in pressurized storage tanks on board the vehicle. The storage tanks receive and dispense hydrogen gas through a series of connections attached to the pressurized hydrogen storage tank. These connections offer opportunities for undesirable loss of hydrogen gas when they become loosened through vibration, repeated thermal expansion and contraction or other mechanisms. The fuel system loses efficiency when the hydrogen escapes. Early recognition of the loose connections would be advantageous to retaining the energy efficiency of the vehicle.

Current signaling methods for loss of hydrogen from the connections are relatively insensitive because the hydrogen is diluted in the large volume of air surrounding the tank. At relatively low concentrations of hydrogen, sensors have lower signal-to-noise ratios. This leads to the possibility of false positive signals that may inconvenience the operator of the vehicle.

What is needed is a more sensitive fuel retention monitoring system for a pressurized hydrogen storage tank on a vehicle while having the monitoring system produce fewer false positive signals.

SUMMARY OF THE INVENTION

The invention relates to a fuel retention monitoring system for a pressurized hydrogen storage tank on a vehicle and its method of use. In an embodiment of this invention, the vehicle includes a hydrogen dispensing system having a plurality of conduits for carrying a hydrogen gas. The conduits have at least one connection linking them together. The monitoring system includes a vapor concentrator for the hydrogen gas, shrouding a first one of the connections. The first connection has a parting line where the conduits forming the connection meet. The vapor concentrator may be positioned above the parting line of the first connection, and may include a periphery and a top defining a headspace cavity. The monitoring system further includes a hydrogen gas sensor locatable adjacent to the headspace cavity and capable of providing a signal correlated to a hydrogen gas concentration in the headspace cavity.

In another embodiment, a fuel retention monitoring system for a pressurized hydrogen storage tank on a vehicle is disclosed. The monitoring system includes a hydrogen dispensing system having a plurality of conduits for carrying hydrogen gas. In this embodiment, the conduits have at least a first connection therebetween. The monitoring system comprises a vapor concentrator having a thin-shell portion with a base and a vertex. The vertex is located above the base in this embodiment and has an aperture adjacent to the vertex. The base is located above and adjacent to a parting line of the first connection of the dispensing system. In this embodiment, the monitoring system additionally comprises a hydrogen gas sensor located adjacent to the aperture and capable of providing a signal to a vehicle control system.

An additional embodiment of this invention includes a method for monitoring fuel retention for a pressurized hydrogen storage tank on a vehicle. The vehicle includes a hydrogen dispensing system having a plurality of conduits for carrying hydrogen gas. The conduits in this embodiment have at least a first connection therebetween. The method comprises generating a first electronic signal from a hydrogen sensor located adjacent to a vapor concentrator shrouding the first connection of the hydrogen gas dispensing system. The next step of this embodiment of the invention includes assessing whether the first signal exceeds a first threshold value. The next step in this embodiment is assessing whether the first signal exceeds a second threshold value which is greater than the first threshold value. The next step in this embodiment is assessing whether the first signal exceeds a third threshold value greater than the second threshold value. The next step in this embodiment is generating a second electronic signal correlated to the maximum threshold value exceeded and transmitting the second signal to an electronic logic circuit which controls the portion of the vehicle.

BRIEF DESCRIPTION OF THE DRAWINGS

FIG. 6 illustrates a fuel retention monitoring method according to an embodiment of the invention.

DETAILED DESCRIPTION OF THE PREFERRED EMBODIMENT(S)

Reference will now be made in detail to compositions, embodiments and methods of the present invention known to the inventors; however, it is understood that the disclosed embodiments are merely exemplary of the present invention which may be embodied in various alternative forms. Therefore, specific details disclosed herein are not to be interpreted as limiting, rather merely as a representative basis for teaching one skilled in the art to variously employ the present invention.

Except where expressly indicated all numerical quantities in this description indicating amounts of material or conditions of reaction and/or use are to be understood as modified by the word "about" in describing the broadest scope of the present invention. Practice within the numerical limits stated is generally preferred.

Figure 1:
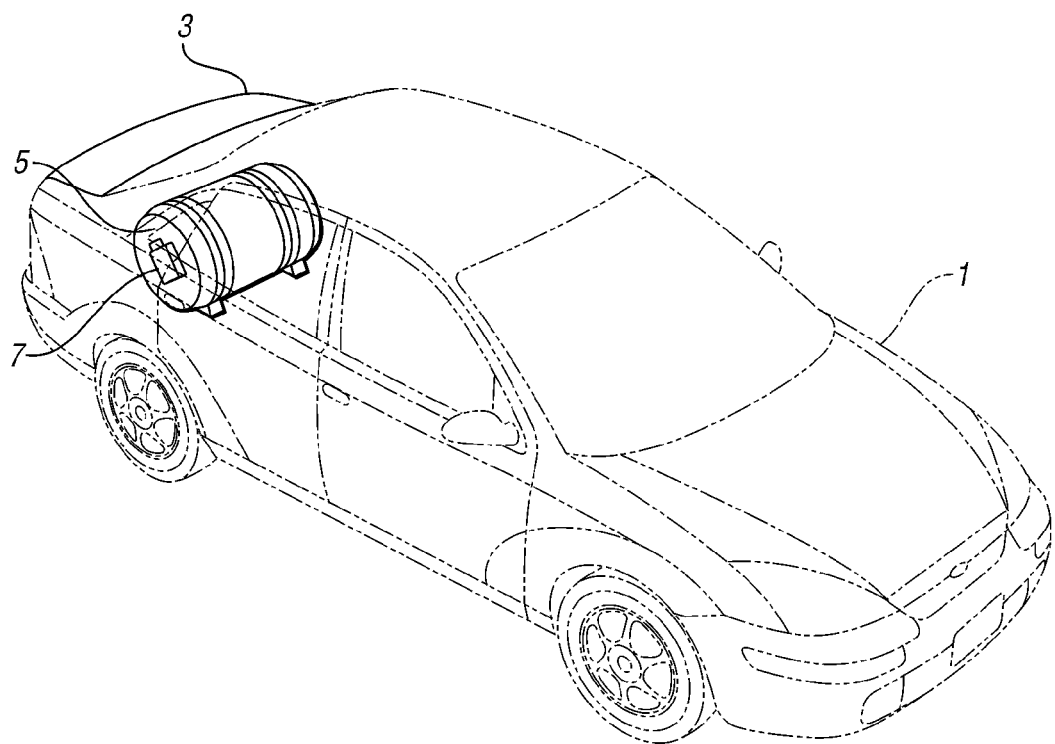
FIG. 1 is a perspective view of a vehicle having a pressurized hydrogen storage tank according to an embodiment of the invention.

FIG. 1 shows a vehicle 1 having a trunk 3. In the illustrated embodiment, the trunk 3 contains a pressurized hydrogen storage tank 5 having a shroud 7. It is understood that the pressurized hydrogen storage tank 5 may be positioned in other areas of the vehicle without departing from the spirit of the invention. It is further understood that the shroud 7 may also be placed in different locations in the vehicle 1 and relative to the hydrogen storage tank 5.

Figure 2:
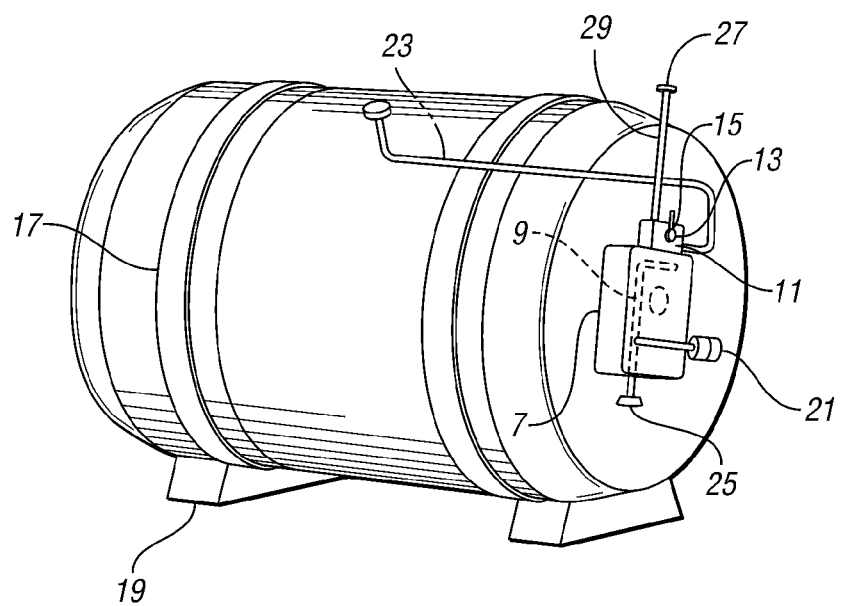
FIG. 2 is a fragmentary perspective view of a pressurized hydrogen storage tank and fuel retention monitoring system according to one embodiment of the invention.

FIG. 2 illustrates an embodiment of the hydrogen storage tank 5 having the shroud 7 covering a portion of a hydrogen gas management system 9. The hydrogen gas management system 9 has a vapor concentrator 11 with an optional aperture 13. Adjacent to the aperture 13 is a hydrogen gas sensor 15. The hydrogen storage tank 5 may have bands 17 holding it to a stand 19 secured to the vehicle 1.

The hydrogen gas management system 9 may control both loading hydrogen gas into or dispensing hydrogen gas from the hydrogen storage tank 5. The vapor concentrator 11 allows hydrogen gas seeping from the hydrogen gas management system 9 to be concentrated. The hydrogen gas is lighter than air, and rises into the vapor concentrator 11. Here it may displace heavier gas in the upper portion of the vapor concentrator 11. This displacement may increase the relative concentration of the hydrogen gas in the vapor concentrator 11, and thereby allow more rapid detection by the hydrogen gas sensor 15 of hydrogen gas seeping from the hydrogen gas management system 9.

The illustration indicates a relatively flat surface for the end for the hydrogen storage tank 5 on which the shroud 7 is located. It is understood that the surface of the end of the hydrogen storage tank 5 may be more spherical. It is further understood that sealing the shroud 7 to such a surface may include no deficiencies to the shroud 7 structure. Non-limiting examples of such modifications may include a flange and/or surfaces allowing cooperation with the gas management system 9 and tank 5 interface and/or a two-part shroud with one part sealed and/or adjacent to the tank 7 and a second part that may be sealed and/or secured to the first part.

The aperture 13, when used, allows accumulated hydrogen gas to exit the vapor concentrator 11. The aperture 13 may be positioned at or near a highest portion of the vapor concentrator 11 in an attempt to assure that the vapor exiting the vapor concentrator 11 is relatively enriched in hydrogen when seepage of hydrogen gas is actually occurring. Enrichment may make the aperture 13 area a good location for positioning the hydrogen gas sensor 15 when the interest is in achieving a good signal-to-noise ratio for the sensor 15.

An alternative concentrator vent 27 is a tube 29 connecting the vapor concentrator 11 with the exterior of the vehicle 1.

A gas inlet quick-disconnect connection 21 is adjacent to the shroud 7. A tank vent 23 exits the shroud and is adjacent to the body of the hydrogen storage tank 5. Also exiting the shroud 7 is an outlet 25 providing low pressure hydrogen gas to an energy system using hydrogen gas. A non-limiting example of such an energy system is a fuel cell.

The quick-disconnect connection 21 may be used typically to attach the hydrogen gas management system 9 to a nozzle from a hydrogen gas bulk supply source located off the vehicle 1. The quick-disconnect routes high pressure hydrogen gas to the hydrogen gas management system 9 for loading into the hydrogen storage tank 5 on the vehicle.

The tank vent 23 may provide an optional vent for the hydrogen storage tank 5 to the exterior of the vehicle 1, for example, when a certain tank pressure is achieved. Although the hydrogen gas from the tank vent 23 may be partially collected in the vapor concentrator 11, typically the emissions from the vent 23 are released outside of the shrouded area and directly to the external environment. Release relatively far away from and above the shroud may decrease false positive signals generated by the hydrogen sensor associated with tank venting.

Figure 3:
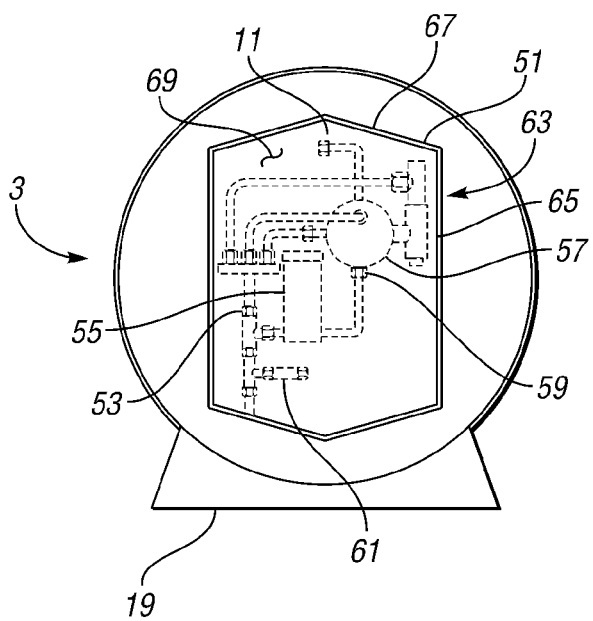
FIG. 3 is a fragmentary cross-sectional view of an embodiment of components of a fuel retention monitoring system according to the invention.

FIG. 3 illustrates an alternative embodiment of the invention having a vent box shroud 51 covering a plurality of pipe connections 53, a pressure regulator 55, and a tank-to-gas management system connection 57. On the high pressure side of the pressure regulator 55 is an active fitting 59 which may contain hydrogen gas during operation of the hydrogen gas management system 9. On the low pressure side of the pressure regulator 55 is a low pressure fitting 61. The low pressure fitting 61 may typically convey the hydrogen gas to an inlet of an energy system, such as the fuel cell described above. This figure illustrates a vent box 63 completely encapsulating the fuel loading and dispensing piping according to an embodiment of this invention. The vent box 63 has a periphery 65 and a top 67 defining a headspace cavity 69. It is understood that the vent box shroud 51 may encapsulate selectably a portion of the pipe connections 53. A non-limiting example includes encapsulating only the active fittings 59, such as the fitting containing the high pressure gas. The vent box shroud 51 may be selectably gas tight, or it may allow mixing of gas within the shroud. Non-limiting examples of gas mixing circulation mechanisms may include passive ventilation, active ventilation, or apertures in the wall of the vent box shroud 51.

Figure 4:
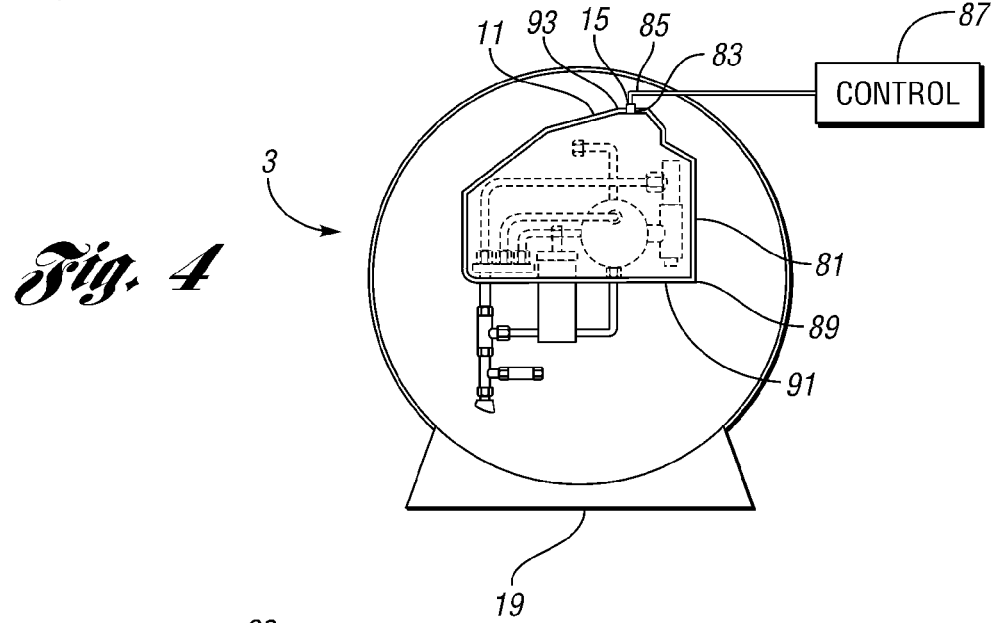
FIG. 4 is a fragmentary cross-sectional view of an alternate embodiment of components of the fuel retention monitoring system according to the invention.

FIG. 4 illustrates an alternative embodiment of the invention. In this non-limiting example, a hood shroud 81 having an aperture 83 covers a portion of the hydrogen gas management system 9. The hydrogen gas sensor 15 is positioned in or adjacent to the aperture 83. The hydrogen gas sensor 15 provides a signal line 85 to a vehicle control system 87. As explained below, the vehicle control system 87 may control various vehicle systems in response to signals received from the sensor 15.

The hood 81 has a base 89 which includes a periphery defining an opening 91 through which hydrogen gas originating from pipe connections 53 below the base 89 may pass upwards. The opening 91 as illustrated in FIG. 4, when viewed from the side or in perspective extends outwardly from a plane of the figure. The optional aperture 83 may be positioned near the vertex 93 of the hood 81. The base 89 may typically be wider than the area near the aperture 83, facilitating vapor concentration near the aperture 83. The hood shroud 81 may be a thin-shell having a wall thickness typical of molded plastic parts and sheet metal.

Figure 5:
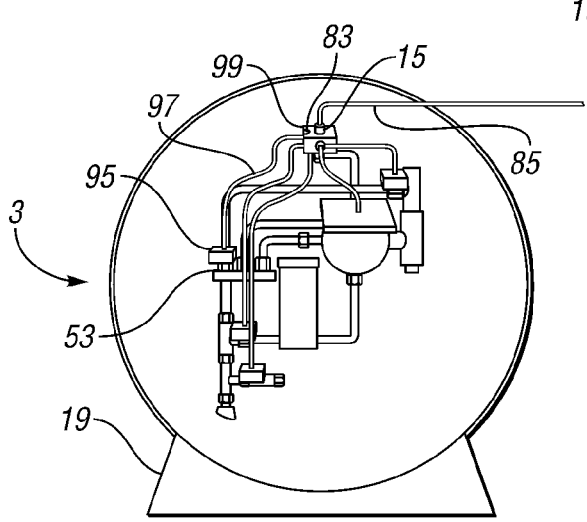
FIG. 5 is a fragmentary cross-sectional view of an alternate embodiment of components of the fuel retention monitoring system according to the invention.

FIG. 5 illustrates an alternative embodiment of the present invention. In this non-limiting example, a connection shroud 95 is located above a parting line of a pipe connection 53 and allows the gas to be collected by a pipe 97 to a manifold shroud 99. The manifold shroud 99 has an aperture 83 in which a hydrogen gas sensor 15 is installed. The hydrogen gas sensor 15 sends a signal to a vehicle control system, such as the vehicle control system 87, through a hydrogen gas sensor signal line 85.

The connection shroud 95 may be a shape closely aligned with the connection 53. Non-limiting examples of the shape may include a conical shape or an overmolding of the connection.

FIG. 6 illustrates a non-limiting example of a logic for a fuel retention monitoring method for a pressurized hydrogen storage tank 5 on a vehicle in accordance with an embodiment of the present invention. In this non-limiting example, at step 111 the hydrogen gas sensor 15 provides a signal to the vehicle control system 87. At step 113, the vehicle control system 87 assesses whether or not the signal has achieved a first threshold value. If the signal does not exceed the first threshold value, step 115 illustrates that no action occurs. At step 117, if the first threshold value is exceeded but a second threshold value is not, at step 119, the vehicle control system 87 detects whether or not fueling is occurring. If fueling is occurring, at step 125 then, fueling stops. If fueling is not occurring, at step 121 an indicator signal may be activated.

At step 127, if the hydrogen gas sensor 15 signals that the amount of hydrogen gas in the shroud exceeds the second threshold value, but does not exceed a third threshold value, the ventilation may be activated at step 129. If the signal indicates that a third threshold value at step 127 has been exceeded, then the vehicle control system 87, at step 131, isolates the fuel from further release from the high pressure hydrogen storage tank 5. The actions at steps 121, 125, 129 or 131 remain in effect in this embodiment until the signal returns below the first threshold at step 123.

The hydrogen gas sensor 15 may be chosen from various types known in the art. Non-limiting examples of the hydrogen gas sensor 15 may include a surface conductivity modification sensor and catalytic-based sensors, such as a thermoelectric conversion sensor with a thin-film platinum catalyst or a catalyst-semiconductor sensor.

Example 1

In this non-limiting example, hydrogen is detected in the vent box shroud 51 by the hydrogen gas sensor 15 at a concentration above a predetermined first set point selected by an engineer. If fueling is occurring, the vehicle control system 87 stops the fueling. If the hydrogen gas sensor 15 detects hydrogen in the vent box shroud 51 above a concentration of a predetermined second set point, that is greater than the first set point, a passive ventilation system is activated. If the hydrogen gas sensor 15 detects hydrogen in the vent box shroud 51 above the concentration of a predetermined third set point, that is relatively greater than the second set point, the fuel is isolated from further release from the high pressure hydrogen storage tank 5.

While embodiments of the invention have been illustrated and described, it is not intended that these embodiments illustrate and describe all possible forms of the invention. Rather, the words used in the specification are words of description rather then limitation, and it is understood that various changes may be made without departing from the spirit or scope of the invention.

What is claimed:

1. A fuel retention monitoring system for a pressurized hydrogen storage tank on a vehicle, the vehicle including a hydrogen dispensing system having a plurality of conduits for carrying a hydrogen gas, the conduits having at least a first connection therebetween, the monitoring system comprising:
   a vapor concentrator for a gas, shrouding the first connection for the hydrogen dispensing system positionable adjacent to the hydrogen storage tank, the vapor concentrator being positioned above a parting line of the first connection and having a periphery and a top defining a headspace cavity; and
   a hydrogen gas sensor locatable adjacent to the headspace cavity and capable of providing a signal correlated to a hydrogen gas concentration in the headspace cavity.

2. The fuel retention monitoring system of claim 1, wherein the vapor concentrator includes a shroud encapsulating the hydrogen dispensing system.

3. The fuel retention monitoring system of claim 1, wherein the vapor concentrator includes an open base.

4. The fuel retention monitoring system of claim 1, wherein the vapor concentrator includes an aperture.

5. The fuel retention monitoring system of claim 1, wherein the vapor concentrator includes one or more connection shrouds connected to a manifold shroud.

6. The fuel retention monitoring system of claim 1, wherein the signal provides input to a vehicle control system having a first threshold value.

7. The fuel retention monitoring system of claim 6, wherein the first threshold value is selectable.

8. The fuel retention monitoring system of claim 6, wherein exceeding the first threshold value activates an indicator signal.

9. The fuel retention monitoring system of claim 6, wherein the signal provides input to the vehicle control system having a second threshold value greater than the first threshold value and a third threshold value greater than the second threshold value.

10. The fuel retention monitoring system of claim 9, wherein the second threshold value is selectable.

11. The fuel retention monitoring system of claim 10, wherein exceeding the second threshold value activates a passive ventilation system.

12. The fuel retention monitoring system of claim 9, wherein the third threshold value is selectable.

13. The fuel retention monitoring system of claim 9, further comprising a hydrogen gas management system configured to isolate the hydrogen storage tank when the third threshold value is exceeded.

14. A fuel retention monitoring system for a pressurized hydrogen storage tank on a vehicle, the vehicle including a hydrogen dispensing system having a plurality of conduits for carrying a hydrogen gas, the conduits having at least a first connection therebetween, the monitoring system comprising:
   a vapor concentrator having a shaped thin-shell portion, the thin-shell portion having a base and a vertex, the vertex being located above the base and having an aperture adjacent to the vertex, the base being located above and adjacent to a parting line of the first connection of the dispensing system; and
   a hydrogen gas sensor locatable adjacent to the aperture and capable of providing a signal to a vehicle control system.

15. The fuel retention monitoring system of claim 14, wherein the first connection includes an active fitting.

16. The fuel retention monitoring system of claim 14, wherein the base includes a periphery defining an opening.

17. A method for monitoring fuel retention for a pressurized hydrogen storage tank on a vehicle, the vehicle including a hydrogen dispensing system having a plurality of conduits for carrying a hydrogen gas, the conduits having at least a first connection therebetween, the method comprising:
   generating a first electronic signal from a hydrogen sensor locatable adjacent to a vapor concentrator shrouding the first connection of the hydrogen dispensing system;
   assessing whether the first signal exceeds a first threshold value;
   assessing whether the first signal exceeds a second threshold value greater than the first threshold value;
   assessing whether the first signal exceeds a third threshold value greater than the second threshold value;
   generating a second electronic signal correlated to a maximum threshold value exceeded; and
   transmitting the second signal to an electronic logic circuit, wherein the logic circuit controls a portion of a vehicle.

18. The method of claim 17, wherein the logic circuit assesses whether the second threshold value has been exceeded after the first threshold value has been exceeded, and assesses whether fueling is in progress, wherein if fueling is not in progress, the circuit activates an indicator signal until the first electronic signal returns below the first threshold value, if fueling is in progress, the circuit stops the fueling process until the first electronic signal returns below the first threshold.

19. The method of claim 17, wherein the logic circuit assesses whether the first electronic signal exceeds a third threshold value after it has exceeded a second threshold value, if the first electronic signal has not exceeded the third threshold value, the control system activates a passive ventilation system until the first electronic signal returns below the first threshold level, if the signal does exceed the third threshold value the control system isolates the pressurized fuel storage tank.

20. The method of claim 19, wherein the first threshold value is selectable, the second threshold value is selectable, and the third threshold value is selectable.

* * * * *